United States Patent Office 3,684,546
Patented Aug. 15, 1972

3,684,546
METHOD OF TREATING LUMINESCENT RARE EARTH OXIDE MATERIALS
Michael J. Hammond and Raymond F. Herner, Towanda, Pa., assignors to Sylvania Electric Products Inc.
No Drawing. Filed Feb. 24, 1970, Ser. No. 13,760
Int. Cl. C03c 17/10; H01j 1/64
U.S. Cl. 117—33.5 C
3 Claims

ABSTRACT OF THE DISCLOSURE

Disclosed is a method for preventing chromium contamination of rare-earth oxide phosphors by forming a uniform layer of colloidal ammonium dichromate on a substrate before applying a chromium-free slurry of rare-earth oxide phosphor in an organic binder to the substrate.

BACKGROUND OF THE INVENTION

This invention relates to luminescent substances. More particularly, this invention relates to rare-earth oxide phosphors and to a method of treating such phosphors.

The invention has particular application to luminescent materials comprised of a rare-earth oxide host and a rare-earth activator selected from the lanthanide series of elements. This group of materials, or phosphors, includes gadolinium oxide ($Gd_2O_3$:A), yttrium oxide ($Y_2O_3$:A), and mixtures of the two, together with an activator, designated generally in the formula as A. While not generally so considered, yttrium, for purposes of this disclosure, is to be considered one of the rare-earth elements. All of the above-named materials have strong emission in the red region of the spectrum combined with a brightness considerably in excess of currently employed phosphors used in, for example, color cathode-ray tubes. In spite of these obvious qualifications, there has been a lack of acceptance of these phosphors by tube manufacturers. The two major reasons for this lack of acceptance, both stem from the two currently employed methods of making color-tube screens. These methods are generally distinguished as a dry phosphor deposition method and a slurry application method. This invention has general utility with the slurry deposition method.

In the slurry method, the phosphor is mixed with an organic binder such, for example, as polyvinyl alcohol (PVA) to form a slurry; for example, as by ball milling, and then a sensitizing agent in the form of a dichromate ion furnishing compound is added. After the formation of the slurry is complete, it is applied to the screen area. Subsequently, the phosphor-coated screen area is exposed through a negative to actinic radiation and then developed by steps well understood in the art. The process is repeated for each of the colors needed in the final tube.

In regard, however, to the slurry application, it has been found that the longer the phosphor is in the slurry, the more effect there seems to be upon the emission qualities of the phosphor. This effect from long slurry shelf-life is denoted by a change in body color of the phosphor from white to yellow and a gradual poisoning or killing of the phosphor material per se. Thus, a rare-earth oxide host phosphor remaining too long in contact with the sensitized organic binder ceases to be a phosphor and becomes an inert material exhibiting no luminescent properties under cathode-ray excitation. Furthermore, it has been found that the adherence properties of the rare-earth oxide host phosphors are extremely poor. The adherence capabilities degenerate rapidly in direct proportion to the length of time the phosphor exists in the slurry; that is, the shelf-life of the slurry is extremely short. A slurry mix of a rare-earth oxide host phosphor is generally limited to a shelf-life of around twelve hours. After this time, it is virtually impossible to secure adherence of the phosphor particles to the screen.

The poor adherence qualities and the slow poisoning of the phosphor material per se are believed to occur because of a reaction between the rare-earth oxide host phosphor and the dichromate ion present in the slurry as a photo-sensitizing agent. If the phosphor is allowed sufficient time in the slurry and the reaction is allowed to go to completion, the end result is no longer a rare-earth oxide, but a rare-earth chromate or dichromate combination.

It has been attempted in the past to prevent the chromate reaction by applying to the material a particulate coating such as, for example, a silica, alkoxy-germanium or pyrophosphate. However, such coatings depend upon uniformity thereof for their success and add an additional processing step to the manufacture thereof.

It is believed therefore that a process which increases the shelf-life of the rare-earth oxide phosphor slurry, enhances the adherence properties of phosphors on a substrate, and prevents chromium contamination without adding additional steps and expense is an advancement in the art.

SUMMARY OF THE INVENTION

In accordance with one aspect of this invention, there is provided an improvement in the process for applying a layer of a rare-earth oxide host phosphor to a substrate by photochemical means. The improvement comprises forming a uniform layer of colloidal ammonium dichromate on a substrate and then applying a slurry comprising a rare-earth oxide phosphor and an organic binder relatively uniformly over the layer of ammonium dichromate.

DESCRIPTION OF THE PREFERRED EMBODIMENTS

For a better understanding of the present invention together with other and further objects, advantages, and capabilities, reference is made to the following disclosure and appended claims.

Referring now to the invention with greater particularity, the method for preventing the deleterious reactions with the dichromate ion which is generally present in the slurry formulation as the sensitizer is to eliminate the necessity of having the dichromate source in the slurry and thereby keep the contact time of the phosphor and dichromate source to a minimum. This is accomplished by dusting the substrate with colloidal ammonium dichromate to form a substantially uniform layer of the compound before applying a slurry of a rare-earth oxide host phosphor in an organic binder.

The colloidal ammonium dichromate should not be greater than about 25 microns and preferably between from about 12 microns to about 3 microns, to provide sufficient surface area of the compound to insure dissolution of sufficient amounts of the compound to sensitize the phosphor. A means of preparing colloidal ammonium dichromate is to make a concentrated ammonium dichromate sol and add a small amount of acetic acid to the sol to prevent the formation of chromate ions. The concentrated solution is then admixed with acetone, settle, filtered and dried.

The pH of the slurry can be adjusted from about 5.5 to about 11 to prevent the formation of a rare-earth chromate or dichromate compound when contacted with the dusted colloidal ammonium dichromate. The pH adjustment can be accomplished by the addition thereto of any suitable agent having a pH greater than 7, such as, for example, ammonium hydroxide. The rare earths generally found beneficial with the technique are those selected from the group consisting of yttrium oxide, gadolinium oxide, and yttrium-gadolinium oxide. The host compound can be activated by at least one of the lanthanide series of elements. In particular, the activator can be selected from the group consisting of europium, samarium, and praseodymium and mixtures thereof.

The substrate may be a glass plate or the interior surface of a cathode-ray tube face panel. The slurry is applied to the substrate area by known techniques and any excess is removed. Thereupon the now coated substrate is exposed and developed by steps well understood in the art to form a screen.

Thus, it will be seen that by utilizing this invention, the contact time of a dichromate ion furnishing compound and the phosphor is kept to a minimum, preserving the original brightness of the phosphor through the elimination of the deleterious hydrolytic reaction which formerly destroyed the phosphor. Further, the shelf-life of the slurry employing any of the rare-earth phosphors noted herein is improved and the adherence capabilities are enhanced.

The following examples are submitted to illustrate and not to limit the invention.

EXAMPLE 1

About 150 parts colloidal ammonium dichromate are brushed on a panel. About 100 parts gadolininm oxide, about 13 parts 10% polyvinylalcohol, about 81 parts water, about 0.6 part surfactant, Tamol 731, and about .95 part octyl alcohol are adjusted to about pH 9 with ammonium hydroxide and are then milled for about one hour. About 63 parts 10% polyvinylalcohol and about 0.3 part surfactant, Alkanol B, are then admixed with milled slurry. About 50 parts of the slurry is spun on the panel, exposed, developed and dried by methods known to those skilled in the art.

The rare-earth oxide host phosphor so treated exhibited essentially the same cathode-ray brightness as virgin phosphor.

EXAMPLE 2

Example 1 is repeated using about 100 parts yttrium oxide in place of the gadolinium oxide and essentially the same results were obtained.

EXAMPLE 3

Example 1 is repeated using about 100 parts mixed yttrium-gadolinium oxide and essentially the same results were obtained.

While there have been shown and described what are at present considered the preferred embodiments of the invention, it will be obvious to those skilled in the art that various changes and modifications may be made therein without departing from the scope of the invention as defined by the appended claims.

What is claimed is:

1. In the process wherein a layer of a rare-earth oxide host phosphor is applied to a substrate by photochemical means the improvement comprising
    (a) forming a uniform layer of colloidal ammonium dichromate having a particle size of less than about 25 microns on said substrate; and
    (b) applying a slurry having a pH from about 5.5 to about 11 and comprising a rare-earth oxide phosphor and an organic binder relatively uniformly over said layer of ammonium dichromate.

2. A method according to claim 1 wherein said binder is polyvinylalcohol.

3. A method according to claim 1 wherein said rare-earth oxide host phosphor is selected from the group consisting of yttrium oxide, gadolinium oxide, and yttrium gadolinium oxide.

References Cited

UNITED STATES PATENTS

| | | | |
|---|---|---|---|
| 3,574,129 | 4/1971 | Hammond | 96—36.1 |
| 3,409,558 | 11/1968 | Kachel | 96—36.1 |
| 3,317,319 | 5/1967 | Mayaud | 96—36.1 |
| 3,461,077 | 8/1969 | Kobayashi et al. | 96—36.1 XR |

FOREIGN PATENTS

| | | | |
|---|---|---|---|
| 860,872 | 2/1961 | Great Britain | 96—36.1 |

ALFRED L. LEAVITT, Primary Examiner

M. F. ESPOSITO, Assistant Examiner

U.S. Cl. X.R.

96—35.1, 36.1; 117—33.5 CM, 33.5 CP, 33.5 CS